United States Patent [19]

Sugawara

[11] Patent Number: 5,318,247
[45] Date of Patent: Jun. 7, 1994

[54] LINE RETAINING MECHANISM OF A SPINNING REEL

[75] Inventor: Kenichi Sugawara, Sakai, Japan

[73] Assignee: Shimano Inc., Osaka, Japan

[21] Appl. No.: 717,652

[22] Filed: Jun. 19, 1991

[30] Foreign Application Priority Data

Jun. 22, 1990 [JP] Japan .................... 2-66637[U]

[51] Int. Cl.⁵ .............................................. A01K 89/01
[52] U.S. Cl. ...................................... 242/319; 242/322
[58] Field of Search ............. 242/319, 322, 238, 239, 242/240

[56] References Cited

U.S. PATENT DOCUMENTS

| Re. 27,205 | 10/1971 | Willis et al. | 242/319 |
| 2,755,037 | 7/1956 | Sarah | 242/322 |
| 3,565,362 | 2/1971 | Lilland | 242/322 |
| 4,058,269 | 11/1977 | Nurmse | 242/319 |
| 4,061,288 | 12/1977 | Karlsson et al. | 242/319 |
| 4,106,718 | 8/1978 | Catignani | 242/319 X |
| 4,154,413 | 5/1979 | Hull | 242/319 X |
| 4,561,604 | 12/1985 | Matsushima | 242/319 |
| 4,778,124 | 10/1988 | Shinohara | 242/319 X |

FOREIGN PATENT DOCUMENTS 916583 1/1963 United Kingdom ............... 242/322

Primary Examiner—Daniel P. Stodola
Assistant Examiner—Michael R. Mansen
Attorney, Agent, or Firm—Dickstein, Shapiro & Morin

[57] ABSTRACT

A spinning reel comprising a rotary frame having a bail arm, a spool which reciprocates axially within the rotary frame with rotation of the rotary frame, and a fishing line retainer for preventing a slack fishing line from penetrating an interior space of the rotary frame. The fishing line retainer is engaged with the rotary frame to rotate in unison with the rotary frame, and is engaged with the spool shaft to reciprocate with the spool. In one embodiment, a gap between the spool and the fishing line retainer is adjustable.

18 Claims, 5 Drawing Sheets

LINE RETAINING MECHANISM OF A SPINNING REEL

BACKGROUND OF THE INVENTION

1. Field of the Invention

The present invention relates to a spinning reel, and more particularly to a spinning reel comprising a rotary frame having a bail arm, a spool reciprocable axially of the rotary frame with rotation of the rotary frame, and a fishing line retainer for preventing the fishing line from slipping out of a rear end wall of a fishing line holding portion of the spool.

2. Description of the Related Art

In the spinning reel, the fishing line wound around the fishing line holding portion of the spool is sometimes loosened under its own resilient returning force to increase a winding diameter thereof. In such a case, the loosened fishing line deviates from the fishing line holding portion to pass over the rear end wall and fall onto the axis of the rotary frame, and then possibly winds about the support shaft positioned at the axis or winds about other parts, as a result of which the fishing line could be broken. The fishing line tends to slip out of the fishing line holding portion, particularly when a velocity of winding the fishing line becomes low or the rear end wall of the spool is reduced in longitudinal dimension resulting from the reel made compact.

As disclosed in Japanese Utility Model Application "Kokai" No. 63-55870, a conventional structure employs a mechanism for preventing the fishing line from passing over the rear end wall and moving toward the axis of the rotary frame through the fishing line retainer. More particularly, the support shaft is supported by supporting arms of the rotary frame having the bail arm extending longitudinally of the supporting arms (along a spool moving direction), and has a roller fitted thereon. The roller is rotatable about and slidable along axially of the support shaft.

An annular groove is defined in the rear end wall of the spool for engaging the roller thereby to move the roller about the spool with rotation of the rotary frame, to relatively rotate the roller about the support shaft, and to reciprocate the roller in the axial direction in unison with the spool. Thus, the roller prevents the fishing line slipping out of the fishing line holding portion from falling onto the axis.

However, the roller is simply mounted adjacent the supporting arm of the rotary frame for preventing slump of the fishing line only at the position of the roller. In other words, the roller can perform its holding function if it is located at the fishing line slipping out of a peripheral part of the rear end wall, but cannot prevent the fishing line from slipping out of the fishing line holding portion through a space defined by the roller revolving around the spool and falling onto the axis of the rotary frame.

On the other hand, Japanese Utility Model Application "Kokai" No. 60-106466 shows an example of the fishing line retainer arranged along a peripheral direction of the rear end wall except a portion engaged with the supporting arms of the rotary frame. However, this structure does not perform a sufficient function against the fishing line having an extended diameter which enters toward the axis along an inner surface of the supporting arm.

SUMMARY OF THE INVENTION

A primary object of the present invention is to provide a spinning reel defining an improved fishing line receiving portion in the fishing line retainer for enhancing the function to prevent slump of the fishing line.

In order to achieve the above-noted object, the spinning reel according to the present invention is characterized in that the fishing line retainer defines an engaging portion engageable with the rotary frame to be rotated in unison with the rotary frame, and an annular fishing line stopper portion positioned in the vicinity of the rear end wall of the fishing line holding portion.

This construction has the following functions and effects.

The annular fishing line stopper portion is defined in the fishing line retainer rotatable in unison with the rotary frame and is arranged in the vicinity of the rear end wall of the fishing line holding portion to stop the fishing line slipping out of any portion of the periphery of the rear end wall of the spool thereby to reliably prevent the fishing line from moving toward the axis of the rotary frame.

Thus, an improved spinning reel can be realized in which the fishing line is prevented more effectively from moving toward the axis of the rotary frame than in the conventional art. At the same time, the angler can readily wind up the fishing line caught in the stopper portion back to the fishing line holding portion before the fishing line is broken.

Other objects, features and advantages of the invention will be apparent from the following description.

BRIEF DESCRIPTION OF THE DRAWINGS

The drawings show a spinning reel embodying the present invention in which.

DETAILED DESCRIPTION OF THE PREFERRED EMBODIMENTS

Figure 1:
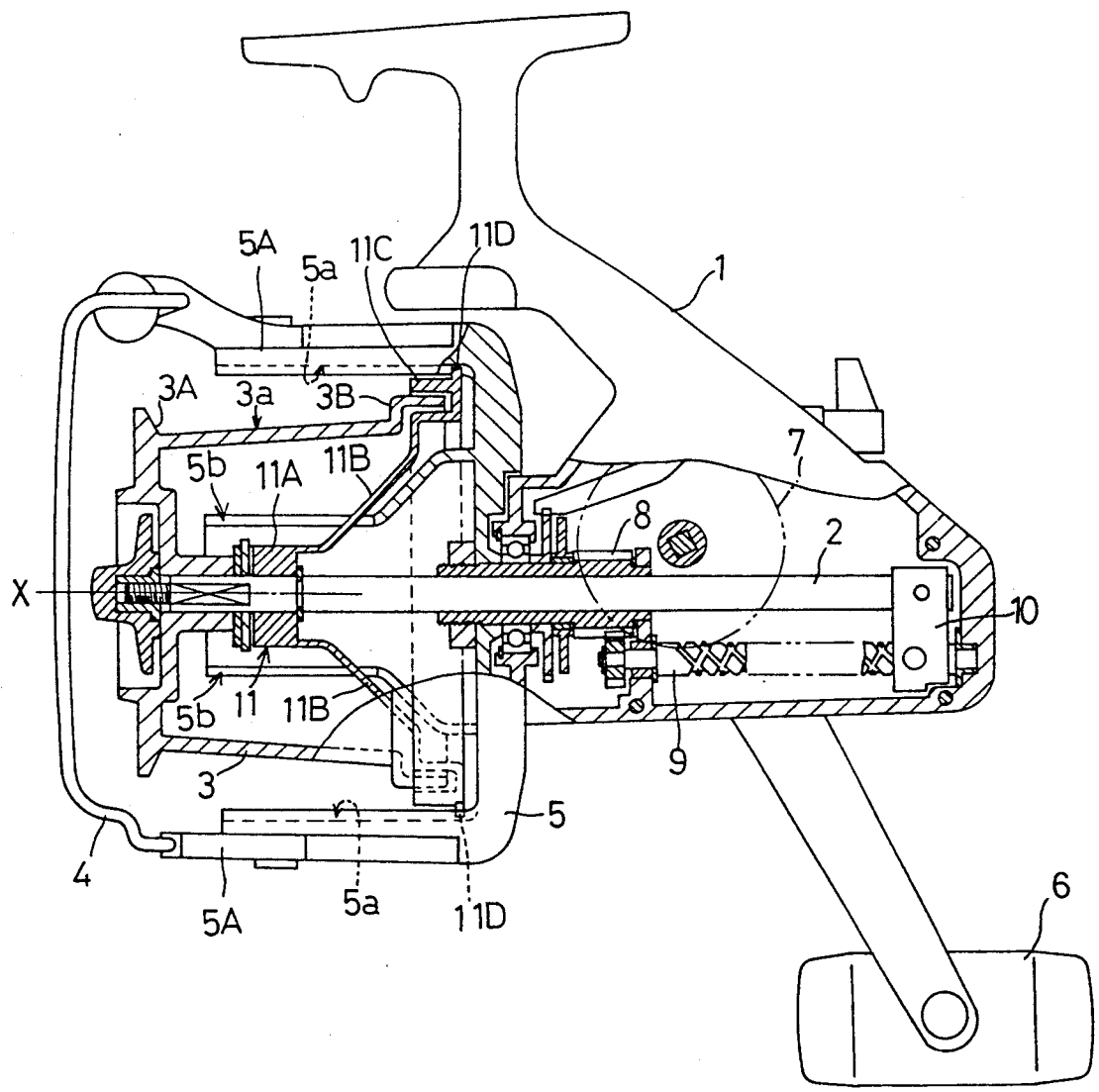
FIG. 1 is a sectional side view of a spinning reel according to the present invention.

A spinning reel embodying the present invention will be described in detail referring to the drawings.

FIG. 1 shows a spinning reel comprising a reel body 1, a rotary frame 5, and a support shaft 2 extending forwardly of the reel body 1 and defining an axis X of rotation of the rotary frame 5. The support shaft 2 carries a spool 3, around which a fishing line is wound. The rotary frame 5 having a bail arm 4 for taking up the fishing line to the spool 3 is attached to the support shaft 2 to be freely rotatable about the axis X of the support shaft 2. The reel body 1 includes a rotary frame driving system having a master gear 7 driven by a handle 6 for taking up the fishing line, and a pinion gear 8 meshed with the master gear 7 to receive power to drive the rotary frame 5. A spool driving system is formed of a helical groove shaft 9 and a slider 10 receiving the power from the pinion gear 8 for axially reciprocating the support shaft 2. The support shaft 2 is axially movable in unison with the spool 3.

A fishing line holding portion 3a surrounded by a front annular wall 3A and a rear annular wall 3B is defined on an outer peripheral face of the spool 3. The fishing line is wound around the fishing line holding portion 3a by the bail arm 4 rotatable in unison with the rotary frame 5. A position where the fishing line is wound varies with movement of the spool 3 reciprocating synchronously with the rotary frame 5 to keep of the wound fishing line level.

A fishing line retainer 11 for holding the fishing line slipping out of the rear annular wall 3B of the fishing line holding portion 3a will be described below.

Figure 3:
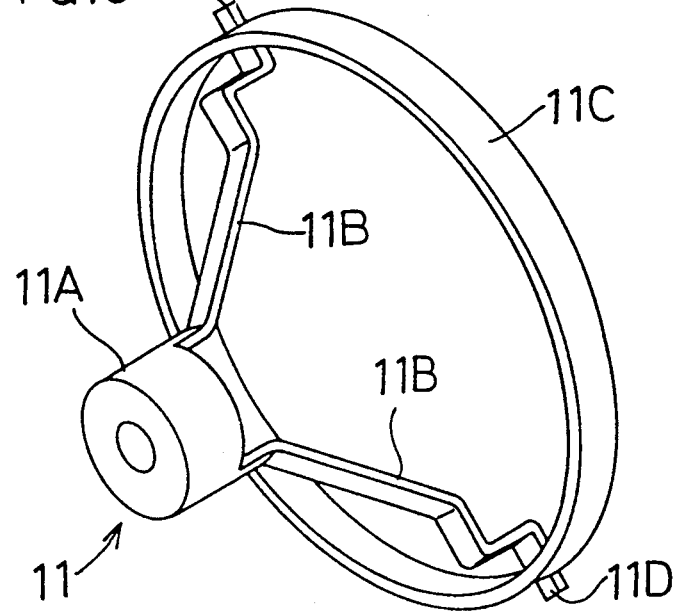
FIG. 3 is a perspective view of a fishing line retainer.

As shown in FIG. 3, the fishing line retainer 11 includes a base boss portion 11A rotatably fitted on and axially movable in unison with the support shaft 2, and an annular frame 11C combined with the base boss portion 11A through two connecting frames 11B. The fishing line retainer 11 further includes first and second engaging portions defined on the annular frame 11C and on the connecting frames 11B to be engageable with the rotary frame 5.

The structure of the first engaging portions will be set forth below.

Figure 2:
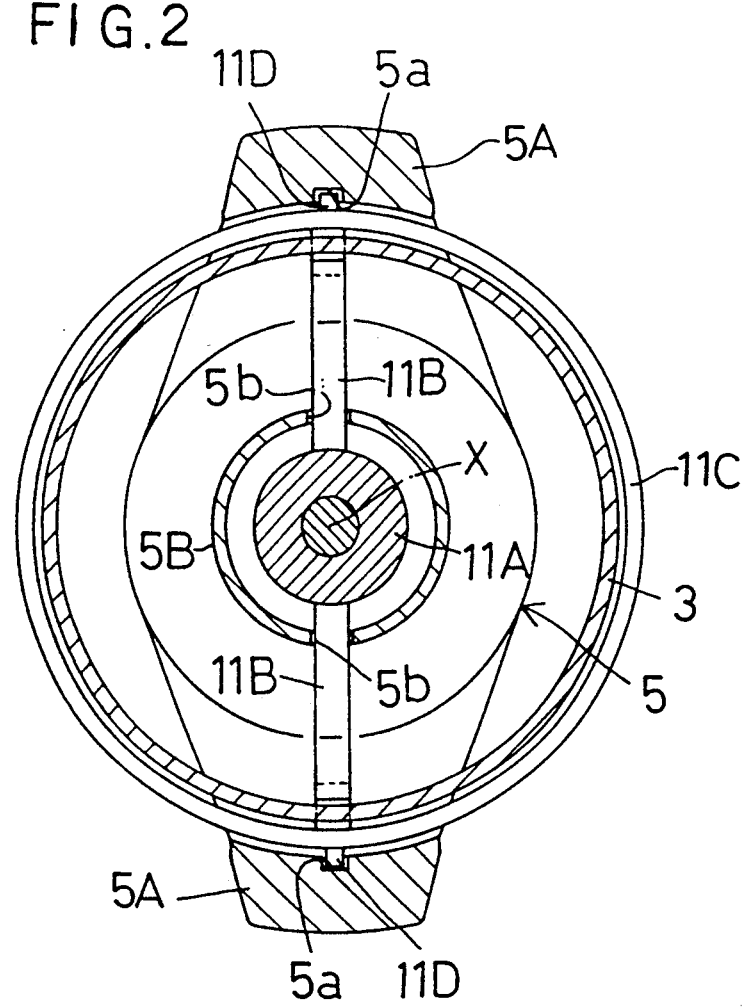
FIG. 2 is a sectional front view of the spinning reel of FIG. 1.

As shown in FIGS. 1 and 2, supporting arms 5A for the bail arm 4 are mounted on the rotary frame 5 along the axis of rotation thereof opposite to each other defining an angle of substantially 180° therebetween. Each of the supporting arms 5A defines a linear groove 5a extending along the axis X in an inner face thereof. On the other hand, plate-like frames 11D extend radially from peripheries of the annular frame 11C or from extreme ends of the connecting frames 11B. Each of the plate-like frames 11D is engaged with the corresponding linear groove 5a of the supporting arm 5A thereby to act as the first engaging portion.

The structure of the second engaging portion will be described next.

As seen from FIGS. 1 through 3, a cantilever cylindrical boss 5B extends along the axis X of rotation of the rotary frame 5 and defines cutout grooves 5b in peripheries thereof opposite to each other through an angle of substantially 180°. When the fishing line retainer 11 is attached to the support shaft 2, each connecting frame 11b is engaged with the corresponding cutout groove 5b thereby to act as the second engaging portion.

Thus, the fishing line retainer 11 is rotated in unison with the rotary frame 5 with engagement between each first engaging portion 11D and the linear groove 5a of the rotary frame 5, and between each second engaging portion 11B and the cutout groove 5b, and concurrently is allowed to reciprocate along the axis X through the cutout grooves 5b and linear grooves 5a.

As shown in FIG. 3, the annular frame 11C combined with the connecting frames 11B is mounted along the axis X in the vicinity of an outer peripheral face of the rear end wall of the spool 3 with the fishing line retainer 11 being attached to the support shaft 2.

Thus, the annular frame 11C stops the fishing line slipping out of the fishing line holding portion beyond the rear end wall 3B of the spool and prevents the fishing line from falling onto the axis X. The annular frame 11C is referred to as the fishing line stopper portion.

The spinning reels embodying the present invention in other various ways will be set forth hereinafter.

Figure 4:
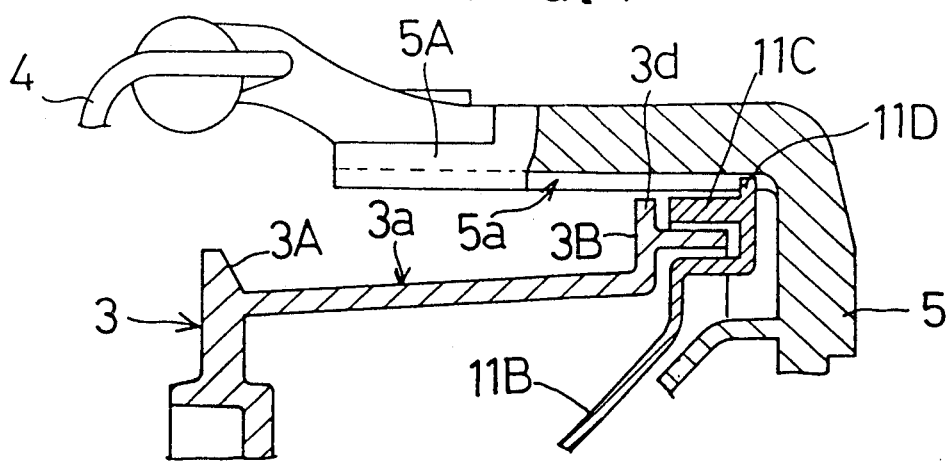
FIGS. 4 and 5 are fragmentary sectional side views of different embodiments each showing a positional relationship between a fishing line stopper portion of the fishing line retainer and a rear end wall of the spool.

(a) As shown in FIG. 4, a vertical wall 3d extends radially outwardly of the rear end wall 3B of the fishing line holding portion 3a. The vertical wall 3d is positioned adjacent a forward end of the annular frame 11C thereby to prevent the fishing line from falling into a space between the vertical wall 3d and the annular frame 11C or, even if it reaches this place, to prevent the line from further falling to the base boss portion 11A of the fishing line retainer 11.

Figure 5:
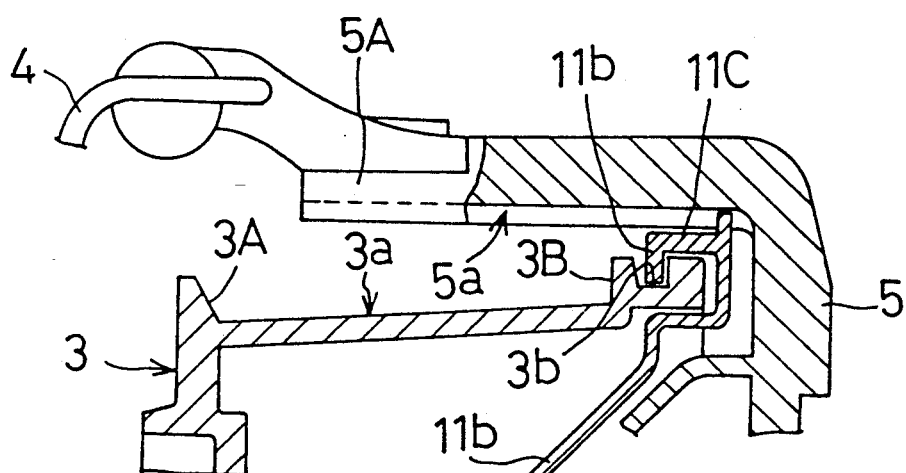

As shown in FIG. 5, a vertical wall 11b may extend from the annular frame 11C into an annular groove 3b defined in the rear end wall 3B to produce the same effect as the structure of FIG. 4.

Figure 7:
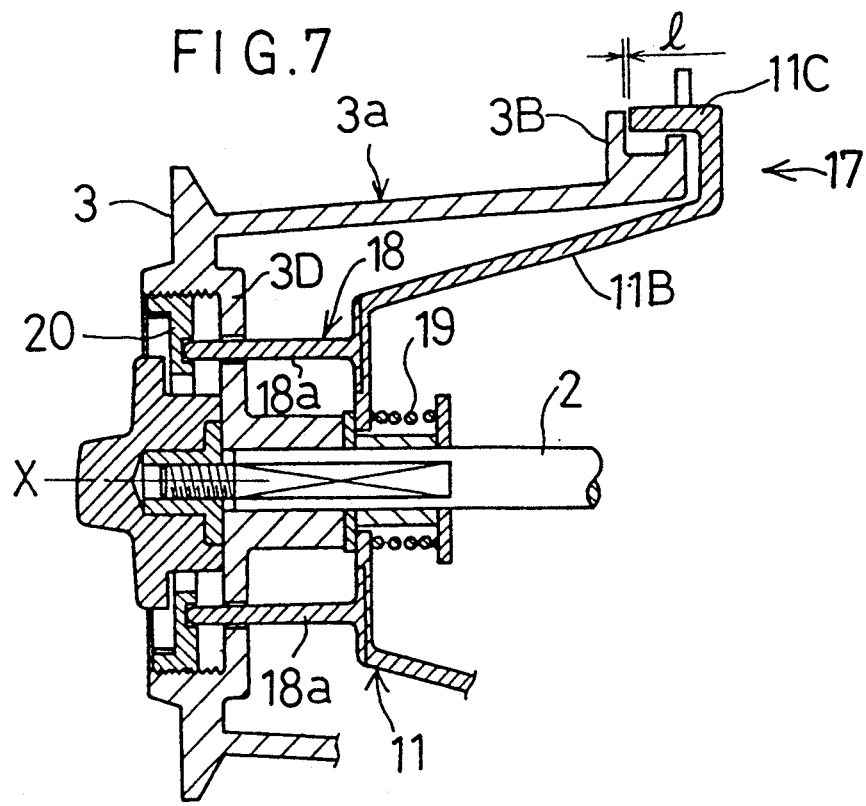

(b) Referring to FIG. 7, an adjusting mechanism 17 may be provided for variably adjusting a fore and aft space l between the forward end of the annular frame 11C of the fishing line retainer and the rear end wall 3B. More particularly, an adjusting element 20 is disposed in a front end portion of the spool 3 and is engaged with a disk-like support element 18 attached to a base end portion of the fishing line retainer 11 and having support pins 18a projecting through a base end portion 3D of the spool. The support pins 18a are arranged at three peripheral positions. The fishing line retainer 11 is supported by the base end portion 3D of the spool 3 through the disk-like support element 18. Further, a spring 19 urges the fishing line retainer 11 in a direction to reduce the fore and aft space l. The adjusting element 20 is screwed to the forward end portion of the spool 3 to contact the support pins 18a and to advance against the urging force of the spring 19 thereby to adjust the fore and aft space l.

Figure 8:
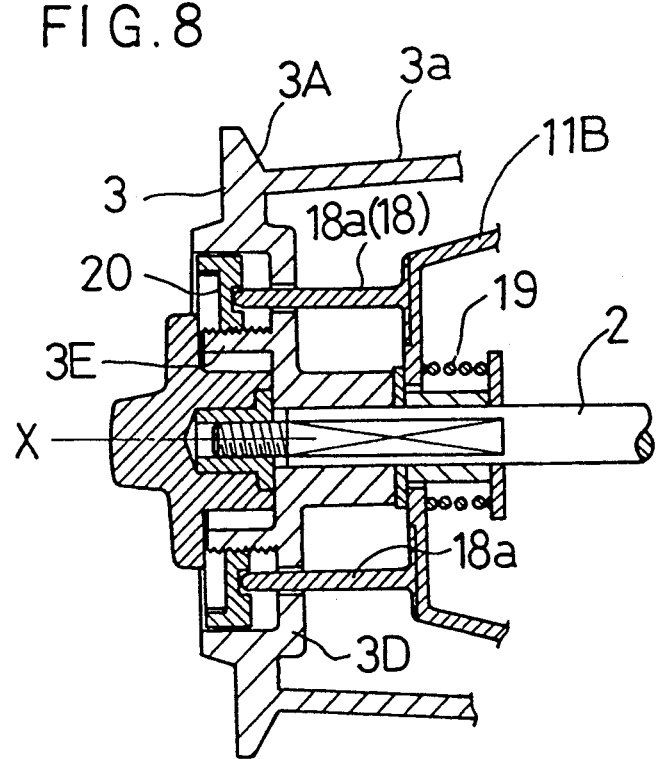

As shown in FIG. 8, the adjusting element 20 may be screwed to an outer periphery of a threaded portion 3E projecting from the forward end portion of the spool 3.

Advantages accruing from the adjusting mechanism will be set forth below.

The fishing line retainer 11 has a simple structure and is not a functional element for bearing a significant load, and is not attached to the support shaft 2 with a strict fitting tolerance. This causes certain wobbling when the retainer rotates in unison with the rotary frame 5 whereby the fishing line retainer 11 contacts the rear end wall of the spool 3 to possibly generate noise. In this connection, the structure of the present invention has the following effects.

1) The adjusting mechanism 17 adjusts differences among individual reels occurring in the manufacturing process, thereby to adjust the fore and aft space l to a proper value.

2) The angler can visually notice slump of the fishing line and increase the fore and aft space l in the daytime fishing when the slipped fishing line can be easily taken up and corrected thereby to restrain the noise generated by contact between the fishing line retainer 11 and the rear end wall 3B of the spool, while reducing the fore and aft space l in the night fishing when the slump of the fishing line cannot be visually confirmed, thereby to prevent the slump of the fishing line as much as possible.

3) A skilled angler who can handle a rod avoiding the slump of the fishing line may use the reel with the fore and aft space l being maintained large as desired.

4) The fore and aft space can be adjusted to be smaller than the diameter of the fishing line to be used.

Figure 6:
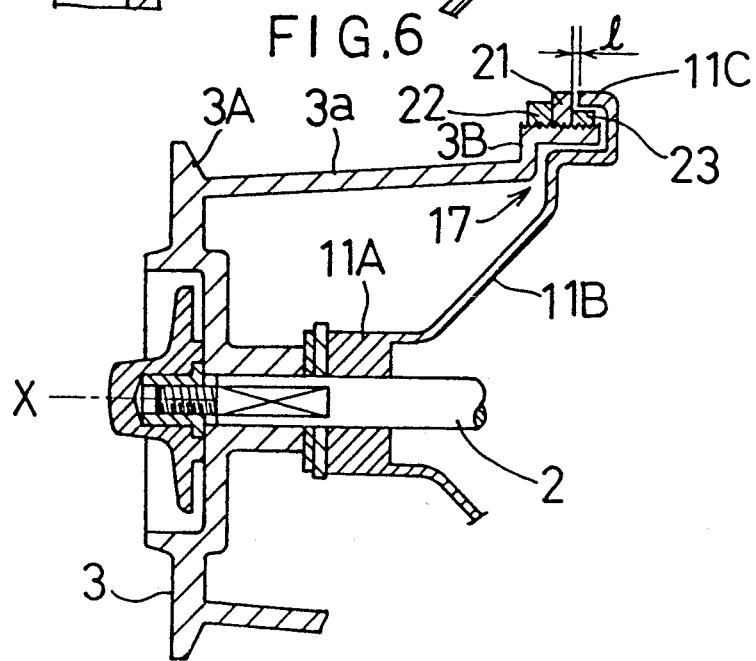
FIGS. 6 through 10 are sectional side views each showing a mechanism for adjusting a space between the fishing line stopper portion and the rear end wall of the spool.
Figure 9:
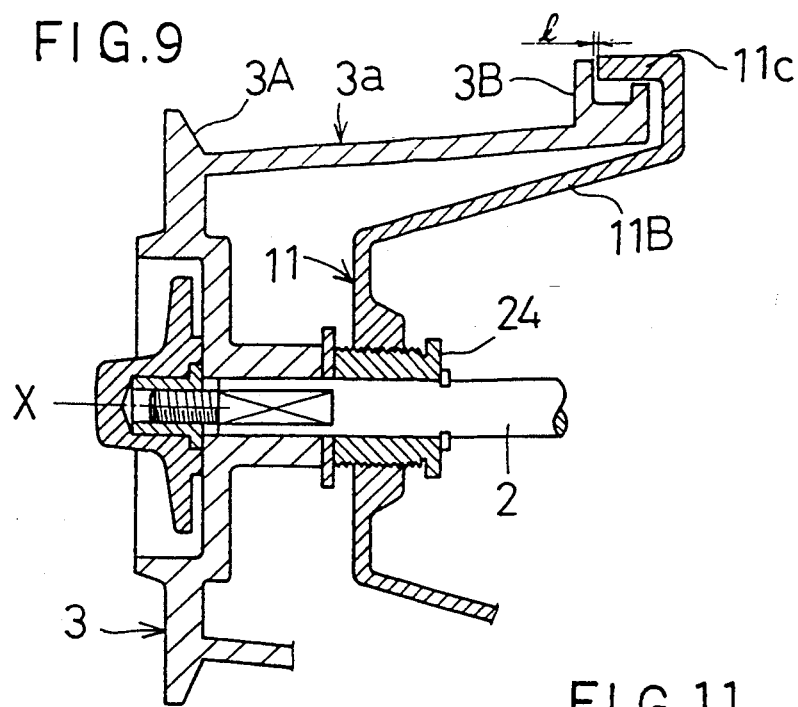
Figure 10:
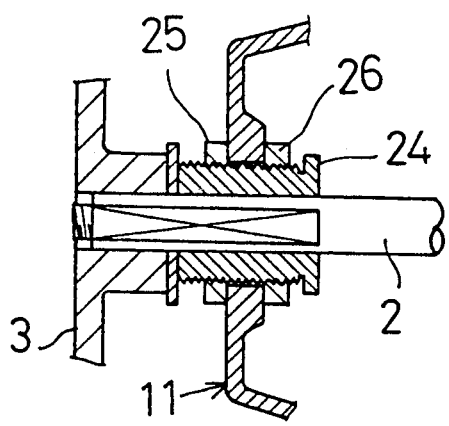
Figure 11:
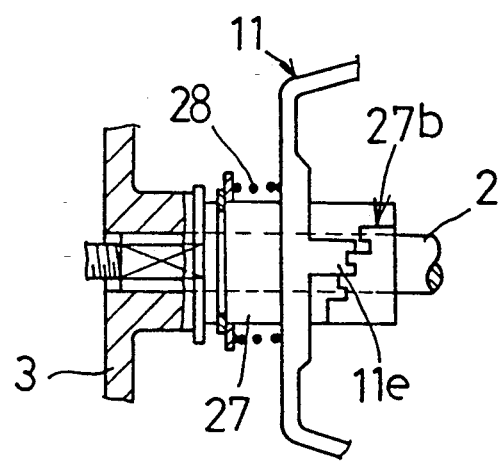
FIGS. 11 through 13 are partially broken-away side views each showing the mechanism for adjusting the space between the fishing line stopper portion and the rear end wall of the spool.
Figure 12:
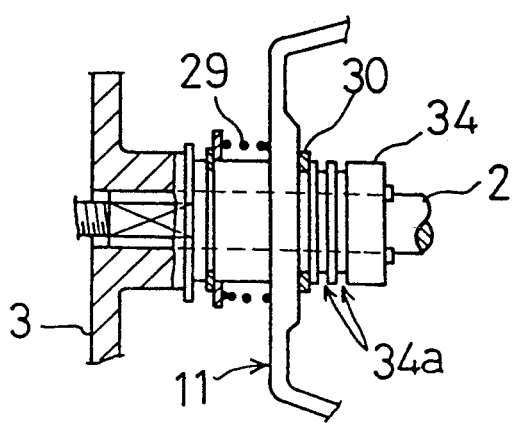
Figure 13:
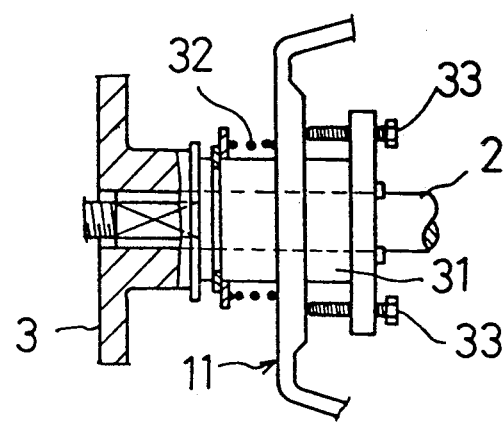

Other adjusting mechanisms will be described next.

c) As shown in FIG. 6, the rear end wall 3B of the spool 3 is peripherally threaded on which a stopper ring 21 is fitted to act as a vertical wall for stopping the fishing line. Forward and rearward nuts 22 and 23 are screwed to the threaded portion for positioning the stopper ring 21. The fore and aft space 1 between the stopper ring 21 and the fishing line retainer 11 may be adjusted by turning the nuts 22 and 23.

d) Referring to FIG. 9, a cylindrical element 24 is freely rotatably fitted on the support shaft 2 and has a threaded outer periphery to which the fishing line retainer 11 is screwed thereby to adjust the fore and aft space 1.

e) As shown in FIG. 10, the fishing line retainer 11 may be loosely fitted on the cylindrical element 24. The base fitting portion of the retainer 11 can be held and positioned by forward and rearward nuts 22 and 23 screwed to the cylindrical element 24 thereby to adjust the fore and aft space 1.

f) In FIG. 11, a cylindrical element 27 is fitted on the support shaft 2, and the fishing line retainer 11 is loosely fitted on the cylindrical element 27. An outer periphery of the cylindrical element 27 defines a receiving portion 27b axially extending stepwise to engage a projection 11e defined on a face of the fishing line retainer 11 opposed to the receiving portion 27b of the cylindrical element 27. Further, a spring 28 urges the fishing line retainer 11 toward the receiving portion 27b. When the retainer 11 is moved away from the receiving portion 27b against an urging force of the spring 28, rotated about the axis X, and then urged again, the projection 11e is engaged with a different step of the receiving portion 27b thereby to adjust the fore and aft space 1.

g) As seen from FIG. 12, the fishing line retainer 11 may be loosely fitted on a cylindrical element 34 fitted on the support shaft 2, and a spring 29 may urge the fishing line retainer 11 axially of the cylindrical element 34. A stopper ring 30 for holding the fishing line retainer 11 is mounted opposite the spring 29 across the fishing line retainer 11, thereby to position the fishing line retainer 11. The cylindrical element 34 defines a plurality of engaging grooves 34a for receiving the stopper ring 30. The fishing line retainer 11 can be variably fixed by engaging the stopper ring 20 with one of the engaging grooves 34a, thereby to adjust the fore and aft space 1.

h) FIG. 13 shows a cylindrical element 31 fitted on the support shaft 2, which in turn carries the fishing line retainer 11 loosely fitted thereon. A spring 32 is mounted forwardly of the fishing line retainer 11 for urging the retainer 11 rearwardly. Adjusting screws 33 are mounted rearwardly of the retainer 11 and attached to a flange portion of the cylindrical element 31. Thus, the fishing line retainer 11 can be variably positioned by movement of the adjusting screws 33 thereby to selectively adjust the fore and aft space 1 as desired.

The annular frame 11c of the fishing line retainer 11 in the constructions shown in FIGS. 11 to 13 is shaped as shown in FIG. 9 and positioned in the vicinity of the rear end wall 3B of the spool with maintaining a space 1 as shown in FIG. 9.

The annular fishing line receiving portion 11C does not necessarily have a completely annular shape, but may be approximately annular defining a space in part of the periphery thereof.

The annular fishing line receiving portion 11C may define a cam face for guiding the fishing line contacting the fishing line receiving portion 11C to the fishing line holding portion.

What is claimed is:

1. A spinning reel, comprising:
    a spool and a spool shaft, said spool shaft defining an axial direction of said reel, said spool and said spool shaft reciprocating axially in accordance with rotation of a handle, a rear end of said spool defining a cylindrical extended portion parallel with an axis of said spool, said cylindrical extended portion having a larger diameter than a line holding portion of said spool, wherein said spool includes an extended flange portion extending radially outwardly of said spool from a front end of said cylindrical extended portion of said spool;
    a rotatable rotor for winding fishing line on said spool in response to rotation of said handle;
    a line retainer including;
        a cylindrical line retaining member extending in parallel with said spool axis positioned to overlap an exterior peripheral surface of said cylindrical extended portion of said spool and positioned to axially face a radially extending portion of said spool, said cylindrical line retaining member facing said extended flange portion in said axial direction,
        a ring member rotatably mounted on said spool shaft, and
        a connecting member for connecting said cylindrical line retaining member to said ring member,
    wherein said line retainer reciprocates axially with said spool and rotates with said rotor in accordance with rotation of said handle; and
    whereby said cylindrical line retaining member prevents a slack fishing line from penetrating past said spool and into an interior space of said rotor.

2. A spinning reel, comprising:
    a spool and a spool shaft; said spool shaft defining an axial direction of said reel, said spool and said spool shaft reciprocating axially in accordance with rotation of a handle, a rear end of said spool defining a cylindrical extended portion parallel with an axis of said spool, said cylindrical extended portion having a larger diameter than a line holding portion of said spool, wherein said spool includes a first extended flange portion extending radially outwardly of said spool from a front end of said cylindrical extended portion of said spool and a second extended flange portion having a smaller diameter than that of said first extended flange portion extending radially outwardly of said spool from a rear end of said cylindrical extended portion of said spool;
    a rotatable rotor for winding fishing line on said spool in response to rotation of said handle;
    a line retainer including:
        a cylindrical line retaining member extending in parallel with said spool axis positioned to overlap an exterior peripheral surface of said cylindrical extended portion of said spool and positioned to axially face a radially extending portion of said spool, said cylindrical line retaining member facing said first extended flange portion in said axial direction of said reel and said cylindrical line retaining member facing said second extended flange portion radially of said spool,
        a ring member rotatably mounted on said spool shaft, and a connecting member for connecting said cylindrical line retaining member to said ring member, wherein said line retainer reciprocates axially with said spool and rotates with said rotor in accordance with rotation of said handle; and whereby said cylindrical line retaining member prevents a slack fishing line from penetrating past said spool and into an interior space of said rotor.

3. A spinning reel comprising:

a spool and a spool shaft, said spool shaft defining an axial direction of said reel, said spool and said spool shaft reciprocating axially in accordance with rotation of a handle, said spool including a rear cylindrical extended portion having a diameter larger than a line holding portion of said spool, said spool including an extended projection portion extending radially outwardly of said spool from a front end of said cylindrical extended portion of said spool;

a rotatable rotor for winding fishing line on said spool in accordance with rotation of said handle;

a line retainer including a cylindrical line retaining member facing a projection provided at a rear end portion of said spool with a gap therebetween, said cylindrical line retaining member facing said extended projection portion in said axial direction, said line retainer reciprocating with said spool and rotating with said rotor, said line retainer preventing a slack fishing line from penetrating through said gap into an interior space of said rotor; and means for adjusting the size of said gap.

4. A spinning reel of claim 3 wherein said adjusting means includes a ring member facing an outer peripheral portion of said line retaining member in said axial direction, said ring member being mounted on said rear cylindrical extended portion of said spool, and said ring member being axially displaceable to axially adjust said gap between said line retaining member and said spool.

5. A spinning reel of claim 4 wherein said ring member is threadedly mounted on an outer periphery of said rear cylindrical extended portion, and the size of said gap between said line retaining member and said spool is axially adjustable by rotating said ring member with respect to said spool.

6. A spinning reel of claim 3 wherein said line retaining member overlaps said rear cylindrical extended portion of said spool, and said adjusting means axially moves said line retaining member with respect to said spool to axially adjust said gap between said line retaining member and said spool.

7. A spinning reel of claim 6, wherein said adjusting means comprises:

biasing means biasing said line retaining member toward a front direction of said reel;

a non-rotatable disk including:

a disk portion rotatably receiving said frontwardly biased line retaining member, a plurality of leg portions extending frontwardly from said disk portion piercing a front wall of said spool and extending frontwardly of said front wall, said non-rotatable disk being non-rotatable with respect to said spool and said non-rotatable disk being axially displacable with respect to said spool, an adjusting disk provided on a front portion of said spool, said adjusting disk being axially displacable, said adjusting disk receiving said frontward biasing force of said line retaining member via said non-rotatable disk.

8. A spinning reel of claim 7 wherein a front face of said spool includes a wall parallel to an axial direction of said reel, said adjusting disk is threadedly mounted on said wall, and the size of said gap is adjusted by rotation of said adjusting disk with respect to said spool.

9. A spinning reel of claim 8 wherein said wall is an interior peripheral surface facing an axis of said spool.

10. A spinning reel of claim 8 wherein said wall is an exterior peripheral surface facing outwardly of an axis of said spool.

11. A spinning reel of claim 6 wherein said adjusting means includes:

a retaining tube mounted on said spool shaft, said retaining tube being rotatable on said axis of said spool and said retaining tube being axially fixed to said spool shaft, said line retaining member being mounted on said retaining tube in such manner that said line retaining member is axially displaceable with respect to said retaining tube to thereby adjust the size of said gap.

12. A spinning reel of claim 11 wherein said line retaining member is threadedly mounted on said retaining tube so that said line retaining member is axially displaceable with respect to said retaining tube.

13. A spinning reel of claim 11 wherein said line retaining member is sandwiched between a pair of threaded ring members threadedly mounted on said retaining tube so that said pair of threaded ring members is axially displacable with respect to said retaining tube thereby axially displacing said line retaining member.

14. A spinning reel of claim 11 wherein said retaining tube includes biasing means at a front portion thereof and said retaining tube includes a plurality of stop means at a rear portion thereof, said plurality of stop means having different axial positions, said line retaining member being selectively biased to one of said stop means by said biasing means, thereby adjusting the size of said gap.

15. A spinning reel of claim 14 wherein said stop means includes a plurality of engaging projections with a series of surfaces directed to the front of said reel, said series of surfaces being located at different axial positions.

16. A spinning reel of claim 11 wherein said retaining tube includes a biasing means at a front portion thereof and said retaining tube includes an axially displaceable stop means, said line retaining member is mounted on said retaining tube and is biased toward said stop means so that axially displacing said stop means adjusts the size of said gap.

17. A spinning reel of claim 16 wherein said displaceable stop means includes a plurality of peripheral grooves defined on said retaining tube and an annular member selectively engageable into said grooves.

18. A spinning reel of claim 16 wherein said retaining tube includes an interior flange extended radially outwardly of said retaining tube from a rear end of said retaining tube, and said displaceable stop means includes a plurality of bolt means threadedly mounted on said interior flange.

* * * * *